(12) United States Patent
Mueller-Wirts

(10) Patent No.: US 6,178,002 B1
(45) Date of Patent: Jan. 23, 2001

(54) METHOD AND DEVICE FOR MEASURING AND STABILIZATION USING SIGNALS FROM A FABRY-PEROT

(76) Inventor: Thomas Mueller-Wirts, Grosser Hillen 35 a, 30559 Hannover (DE)

( * ) Notice: Under 35 U.S.C. 154(b), the term of this patent shall be extended for 0 days.

(21) Appl. No.: 09/204,051

(22) Filed: Dec. 3, 1998

(51) Int. Cl.$^7$ .................................................. G01B 9/02
(52) U.S. Cl. .............................. 356/491; 356/519; 372/32
(58) Field of Search .................................. 356/352, 346, 356/351; 372/32

(56) References Cited

U.S. PATENT DOCUMENTS

| | | | |
|---|---|---|---|
| 5,289,314 | * | 2/1994 | Siebert ................................. 356/352 |
| 5,798,859 | * | 8/1998 | Colbourne et al. .................. 356/352 |

\* cited by examiner

*Primary Examiner*—Samuel A. Turner
(74) *Attorney, Agent, or Firm*—Birch, Stewart, Kolasch & Birch, LLP

(57) ABSTRACT

For measuring a laser frequency electronic signals can be generated by means of optical interferometers, especially Michelson, Mach-Zehnder and Fabry-Perot interferometers. These signals present profiles with a variation of the laser frequency which are practically identical but shifted in phase by 90°. It is common to generate such phase-shifted signals for frequency measurement in various systems, e.g. by means of a sigmameter, which present, however, disadvantages on account of the great number of the necessary high-quality optical components. The inventive method is based on the analysis of transmission and reflection signals of a Fabry-Perot interferometer (FPI) wherein the signals are obtained from two component beams (PBA and PBB) which are passed through slightly different path lengths within the interferometer. These differences in the length of the optical paths are so selected by different angles of incidence of the component beams into the Fabry-Perot interferometer or by an appropriate shape of the interferometer that the required 90° phase shift is adjusted between the detected intensity signals. From these signals electronic signals can be obtained for detection and also for a rapid correction of the laser frequency.

30 Claims, 6 Drawing Sheets

METHOD AND DEVICE FOR MEASURING AND STABILIZATION USING SIGNALS FROM A FABRY-PEROT

The invention relates to a method of and a device for laser frequency measurement and stabilization by means of an interferometer, on the basis of the generation of two signals shifted in phase by roughly 90° relative to each other, which signals are obtained from two component beams of the laser beam to be measured.

PRIOR ART

As a function of the intended application of a laser it may be important to maintain the laser frequency at a constant level, to allow for a desired behavior in frequency de-tuning, the so-called scans, or to provide an appropriate possibility to check the scan behavior or the longitudinal single-mode nature of the laser. To this end the use of optical interferometers, particularly Michelson, Mach-Zehnder and Fabry-Perot interferometers, is common for generating an electrical signal varying as the laser frequency varies. On account of the periodic structure of this signal, however, the laser frequency is not yet fixed because the frequency can be determined only within a period, the so-called free spectral range of the interferometer—which will be briefly referred to as FSR in the following. The resonator mode, i.e. the rough frequency, must then be determined by a further element, e.g. by means of an optical diffraction grating or another interferometer with a correspondingly wider FSR. Moreover, misinterpretation may occur in signal analysis as a result of variations of the intensity of the laser light because the measured signals are normally proportional to the intensity. Therefore, an intensity normalization and a compensation for possible offsets must be realized for precise measurements. Finally, the sinusoidal signal profile in measurement of an individual signal results in the fact that a distinction between the positive and the negative signal edge cannot be made and that the frequency resolution in the maximum and minimum ranges is substantially lower than in the range of the signal edges. These problems can be solved by using two practically identical signals which are, however, shifted through roughly 90° relative to each other.

Such phase-shifted signals can be generated, for instance, by means of a so-called sigmameter. A sigmameter is a modified Michelson interferometer where the specific phase jump characteristics of total reflection are utilized in order to generate two sinusoidal signals shifted by 90°. The measuring beam is detected in the two potential planes of polarization independently of each other. A highly similar principle is the basis of the so-called Koesters interferometer. The essential disadvantage of these systems is the fact that their optical structure consists of a great number of high-quality components. This involves high costs of the system and a great expenditure incurred for mechanical and thermal stabilization provisions. Moreover, a compact design is hardly possible.

Other methods of laser frequency measurement operate on piano-parallel Fabry-Perot interferometers or such devices having a small angle between the reflecting surfaces, so-called Fizeau interferometers. In both cases the laser beam to be measured is spatially expanded and the transmitted or reflected one or two-dimensional structure is detected by a detector array. A digital computer has the function of determining the laser frequency. What is expedient in such a system is the wide frequency range which can be unambiguously calculated within one stage of such a system. Moreover, the frequency spectrum can be determined to a certain extent in longitudinal multi-mode operation. What is inexpedient in these systems is again the high expenditure incurred by the optical elements, particularly the beam expanders, however mainly the detection rate is strongly restricted by the processing by means of the digital computer and the read-out of the detector array. Compared against the method proposed here, a further disadvantage consists in the critical dependence on the spatial structure of the beams to be detected, the transverse mode structure. This structure must be very well known or it must be additionally detected and compensated for high-resolution measurements.

INVENTION

The present invention is based on the problem of proposing a method of laser frequency and mode control which allows for a simple, low-cost and compact structure and simultaneously for a high-speed high-precision detection of the laser frequency. This problem is solved by the method defined in claim 1. The signals so obtained can be used to perform a desired high-speed correction of the laser frequency.

The invention is based on the further problem of providing a device for application of the inventive method. This problem is solved by the device defined in claim 14.

Depending on the angle of incidence of a laser beam on a Fabry-Perot interferometer a different phase shift Φ is obtained between the component beams interfering with each other in the interferometer. This shift is defined by $$\Phi(\alpha, d, \lambda) = 2\pi \frac{2nd}{\lambda} \sqrt{1 - \frac{\sin^2(\alpha)}{n^2}}$$

wherein n is the refractive index within the interferometer, d represents the thickness of the interferometer, α indicates the angle of incidence, and λ corresponds to the wavelength of the incident light. This phase shift Φ determines the fraction of the reflected light versus the transmitted light. It is therefore possible to generate two component beams PBA and PBB having detected intensities of the reflected or transmitted components which present a phase difference of $\Phi_A - \Phi_B = \pi/2$, i.e. 90°, when the wavelength λ varies. This can be achieved by an appropriate selection of the angles of incidence $\alpha_A$ and $\alpha_B$ and by a suitable choice of the optical thickness $d_A$ and $d_B$ of the interferometer at the site of the component beams.

On principle, the inventive method of laser frequency measurement now consists in the aspect that two component beams PBA and PBB, which are to be spatially separated or via their polarization properties, are passed through an interferometer FPI and are reflected by the latter as a function of the laser frequency. The reflected or transmitted components are detected by photosensitive sensors and converted into electronic signals, with the signals being intended to undergo a mutually relative phase shift through roughly 90° when the wavelength varies. This is achieved either by slightly different angles of incidence $\alpha_A$ and $\alpha_B$ or a slightly different thickness $d_A$ and $d_B$ of the interferometer at the site of the component beams PBA and PBB or by different refractive indices $n_A$ and $n_B$ for the two component beams, e.g. by the effect of birefringence.

The interferometer is preferably a Fabry-Perot interferometer which, compared against the other interferometer types, allows for a highly compact structure which is easy to stabilize in both thermal and mechanical terms.

A particularly simple and compact structure is achieved when a substrate consisting of a transparent material is employed as Fabry-Perot interferometer, a so-called etalon.

When the reflecting surfaces present a low degree of reflection the reflected and the transmitted signal display an approximately sinusoidal structure with a mutually relative shift through 180° over the wavelength. Specifically the reflected signal presents a wide scope of contrast and is therefore preferably used for detection.

It is expedient to generate one respective or one common normalization signal for the two component beams, which is proportional to the intensity of the respective component beam, with intensity-independent quadrature signals being generated from the electronic signals by normalization by means of the normalization signals.

With an appropriate summation such an intensity-proportional signal can be generated from the transmitted and the reflected signal of an interferometer for the purpose of normalizing the intensity, without the need for a further beam splitter.

A particular advantage is the fact that the quadrature signals are displayed in two mutually orthogonal coordinates on an visual display means such as an oscilloscope.

A further advantage is the aspect that the measured laser frequency given by quadrature signals, is stabilized to electronically determined set-frequency quadrature signals. In this way the laser frequency can be held constant or can be tuned definitely.

In such a system sine/cosine signals are preferably predetermined as set-frequency quadrature signals.

When the demands on precision are elevated it can also be expedient to predetermine two Airy-functions shifted in phase through roughly 90° instead as set-frequency quadrature signals.

Moreover, signal profiles may be predetermined as set-frequency quadrature signals which have previously been received in an electronic memory means by means of reference measurement, which permits a precise calibration or control of the method as well.

When a suitable signal generation is employed the defects in the sine shape of the measured signals may also be compensated if necessary. In this manner it is possible, for instance, to employ Fabry-Perot interferometers with a higher reflectivity which produce greater signal amplitudes at the same irradiated power; however, the Airy function presents a higher overtone fraction which is compensated in this manner. Moreover, undesirable reflections which take an influence on the shape of the measured signals can be compensated, too, by the determination of suitable set signals in consideration of this fact.

Furthermore, a defect of the mechanically given phase shift through 90° may be compensated by an appropriately corrected phase shift in the generation of the set quadrature signals.

Another possibility is the almost precisely synchronous de-tuning of two or more lasers by using the measured signals of one laser as set values of the second laser.

The generation of an analog-electronic signal, which is proportional to the variation of the measured laser frequency from the predetermined one within certain limits, allows the implementation of high-speed measurements of laser frequency deviations (laser bandwidth) as well as a stabilization and hence a compensation of frequency interference, e.g. as a result of mechanical and acoustic influences on the laser.

The constancy of the set or reference frequency depends essentially on the constancy of the resonant responses of the used interferometer. If necessary the latter must be thermally stabilized. In opposition to the laser the interferometer is, however, a passive optical element and is therefore much easier to stabilize with a substantially higher precision than the laser as such. In particular, it does not include any mechanically moved parts or elements dissipating electrical power.

With the absolute value of the measured quadrature signal being a constant in longitudinal single-mode laser operation, an electronic generation of the absolute value permits a very rapid detection of the longitudinal single-mode which may then be visually displayed or employed for control purposes.

The inventive device for laser frequency measurement consists, on principle, of a beam splitter, with two component beams being generated by reflections at the front and rear sides, an interferometer in which the two component beams passing there-through are given an optical total path length difference of roughly $\lambda/4$, and at least two photosensitive sensors for detecting the two component beams after transmission or reflection by the interferometer and conversion into electronic signals, which display the required relative phase shift by roughly 90° when the wavelength varies.

The required phase shift may be achieved in different embodiments by different angles of incidence of the component beams relative to the optical axis of the interferometer or by different optical thicknesses of the interferometer at the site of the component beams.

The different angles of incidence of the two component beams may be achieved by the application of a wedge-shaped beam splitter or by the introduction of a wedge-shaped substrate between the beam splitter and the interferometer in one or both component beams. Different optical thicknesses of the interferometer for the two component beams may be achieved by the use of a wedge-shaped, a stepped or a subdivided interferometer or by the application of a birefringent material in the interferometer.

Components with locally varying wedge angles may be expediently used as wedge-shaped substrate for the beam splitter function, the function of the deflecting substrate or of the interferometer, e.g. in the form of lenses having a long focal length so that the wedge angle and hence the resulting phase shift of the quadrature signals so obtained may be adapted to the wavelength or possible tolerances of the optical components by a mechanical displacement.

It is moreover expedient to use one or several additional photosensitive detectors which may be used to generate a signal proportional to the intensity of the component beams, which is then used for intensity normalization.

It is advantageous to arrange optical lenses in front of the detectors, which furnish a compensation of the beam offset in translation or rotation of the structure relative to the laser beam. With such a design the adjustment of the required 90° phase shift is simple to realize by adjustment of the entire compact structure without any mechanical interference or a degree of freedom of adjustment within the system.

On account of the possibility of a compact structure it may be expedient to use the system in a form integrated into a laser system rather than as self-contained measuring or control means, i.e. the preparation of suitable mechanical or electrical connections of the device or its control relative to a specific laser system the harmonization of the appearance of the device or its control with the appearance of the laser system.

Several stages of the system, based on the same principle, however with different FSR values of the interferometer, may be combined for an extension of the range of detection or the resolution of detection.

DRAWINGS

With reference to the drawings, embodiments of the invention will be described. In the drawings.

FIG. 11 sketches the graphs of the measured and normalized quadrature signals which are represented in an orthogonal coordinate system, a) with a proper scan behavior b) with occurrence of a mode jump, and c) with occurrence of multi-mode operation.

EMBODIMENTS

Figure 1:
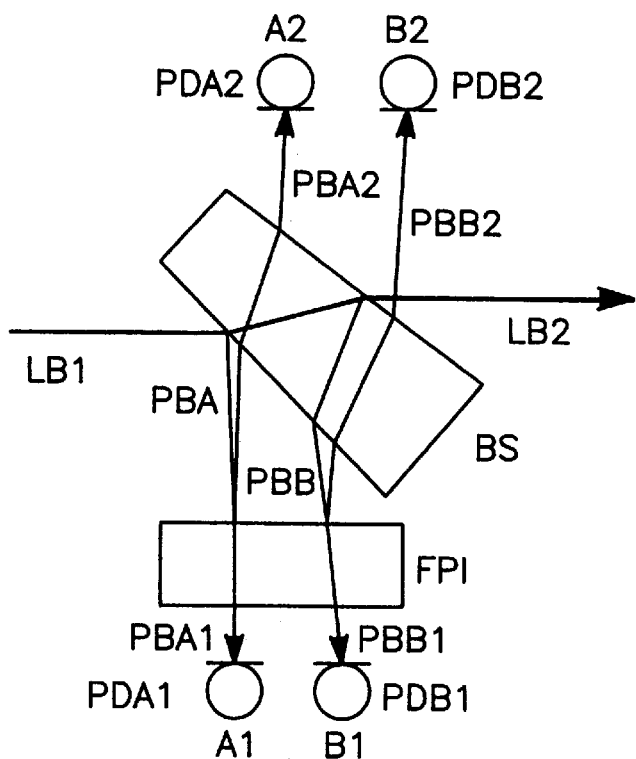
FIG. 1 shows a system for laser frequency measurement with a wedge-shaped beam splitter.

FIG. 1 illustrates a system for realizing the inventive method. The incident laser beam LB1 strikes on a beam splitter BS. The latter is preferably a non-coated glass substrate because for the measuring method only a fraction of the laser radiation is sufficient and a majority of the laser power should still be available in the emerging beam LB2 for the intended application proper. The component PBA reflected from the front surface of the beam splitter now passes through a low finesse etalon FPI. The component beam PBA2 reflected by the etalon is detected by the photodiode PDA2 and converted into the electrical signal A2. This signal has a frequency-dependent profile with a high contrast ratio, however it is proportional to the intensity. The beam PBA1 transmitted by the etalon is converted into the signal A1 by the photodiode PDA1. Then a frequency-independent signal IA proportional to the intensity can be generated from an appropriate electronic summation of the signals A1 and A2, which is then used for normalizing the signal A2. This results in the intensity-independent signal A* (cf. also FIG. 7). In the same manner, one fraction of the laser beam is reflected on the rear side of the beam splitter BS. The resulting component beam PBB is equally reflected by the etalon as a function of the frequency in the form of the component beam PBB2 and furnishes the electrical signal B2 to the photodiode PDB2, which can then be normalized by means of the transmitted beam PBB1 and by generation of the signal B1 with the photodiode PDB1, with calculation of the intensity signal IB, so as to form the signal B*. The required phase difference between the resultant signals A* and B* is generated by the provision that the beam splitter does not include plano-parallel surfaces but is slightly wedge-shaped, with the angle deriving from the respective laser wavelength and the FSR of the Fabry-Perot etalon in accordance with the indicated formula.

Figure 2:
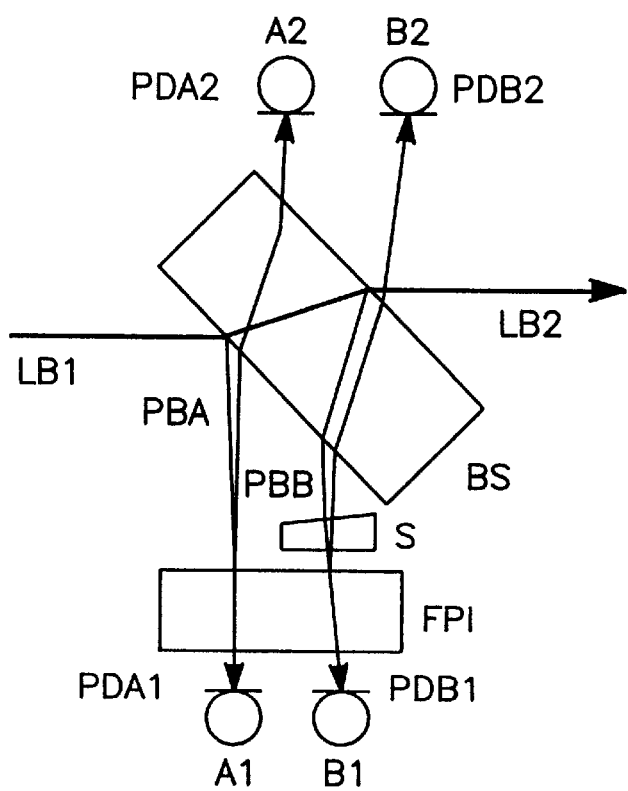
FIG. 2 is an illustration of a system for laser frequency measurement with a wedge-shaped plate in one of the two component beams.

FIG. 2 shows another embodiment of the inventive optical system. This arrangement differs from the system according to FIG. 1 by the provision that the angle, which is required for the phase shift between the component beams, is generated by transmission through a wedge-shaped substrate S. This substrate S is inserted between the beam splitter BS and the etalon FPI into the optical path of one of the component beams or of both beams, hence generating the required variation of the angle. This modification permits an unproblematic adaptation to different wavelengths or etalon thicknesses by simple exchange of the substrate. The demands on the tolerance of the angle between the surfaces are lower than in the system shown in FIG. 1. It is equally possible to provide different angles along the substrate so as to implement the adaptation of the phase shift to the wavelength by mechanically shifting the substrate.

Figure 3:
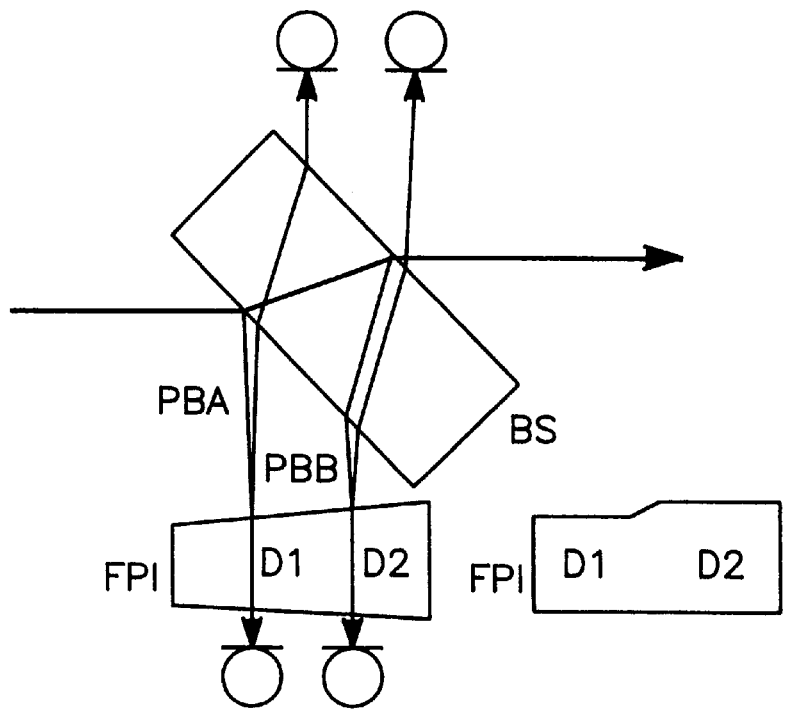
FIG. 3 is a view of a system for laser frequency measurement including a wedge-shaped or stepped Fabry-Perot etalon.

FIG. 3 shows a system similar to the one of FIG. 1, however here the required phase shift is achieved by different thicknesses of the etalon FPI at the site of the component beams. This can be achieved by a selective wedge-shaped configuration or also by measuring and selection an appropriate substrate with thickness variations which occur on account of the manufacturing process anyhow, because the required difference in thickness is within the range of one eighth of the wavelength and hence within the tolerance range of common manufacturing methods. In an alternative, a stepped substrate can also be used wherein an optical thickness increased by $\lambda/8$ was achieved on one half by means of an optical coating.

Figure 4:
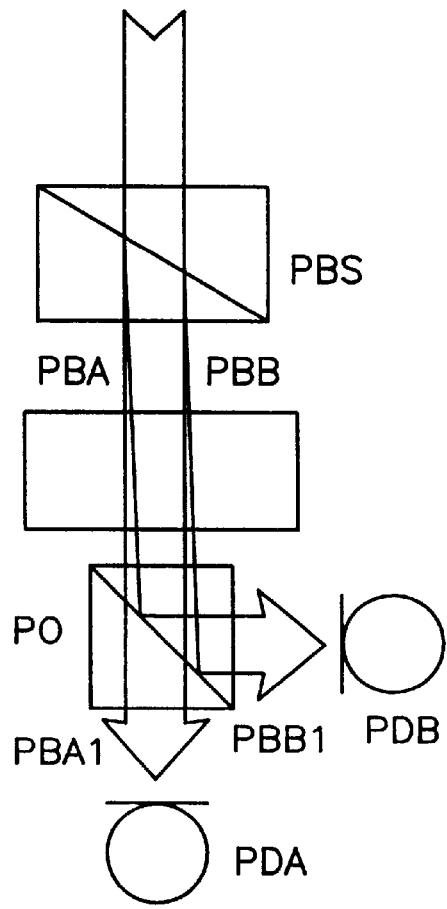
FIG. 4 shows a system for laser frequency measurement with a polarization-dependent beam splitter system.

FIG. 4 shows a system where, in distinction from FIG. 1, the component beams (PBA and PBB) which strike the etalon at different angles of incidence are not directly separated in space because they originate from a polarization-dependent beam splitter element PBS, e.g. a Wollaston prism, which generates only a small angle between both component beams. For an independent detection of the transmitted component beams (PBA1, PBB1) with the sensors (PDA and PDB) therefore an optical polarizing system (PO), e.g. a polarizing beam splitter, must be used. In this arrangement the insensitivity to comparatively widely expanded test beams with the yet possible highly compact structure is an advantage. The application of a Wollaston prism or a similar (expensive) element justifies the application in such a system when such an element and a suitable normalization signal are contained in the structure anyhow.

Figure 5:
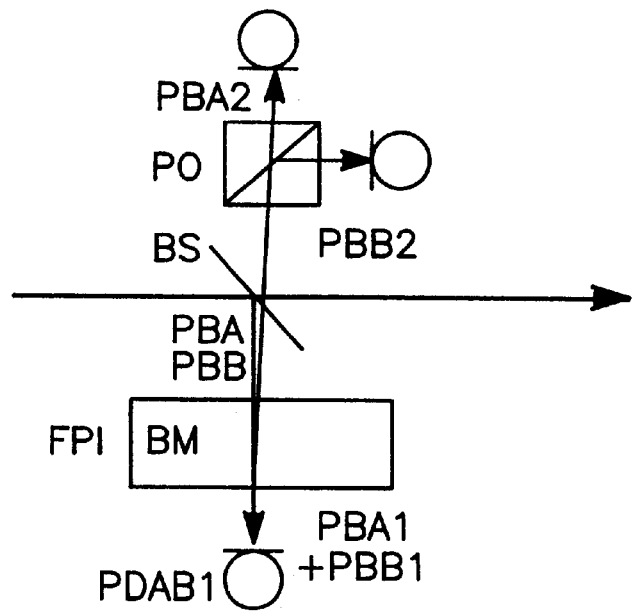
FIG. 5 is the illustration of a system for laser frequency measurement with a birefringent Fabry-Perot etalon.

FIG. 5 shows a system where the two component beams are distinguished only by the length of their optical path within the etalon FPI, but not by their spatial course. This is achieved by the use of a birefringent material BM for the FPI etalon with a different refractive index for the different polarization planes. Here, too, the component beams (PBA2, PBB2) are detected independently by means of an optical polarizing system PO. The signal used for normalization can be achieved by a common detector PDAB1.

Figure 6:
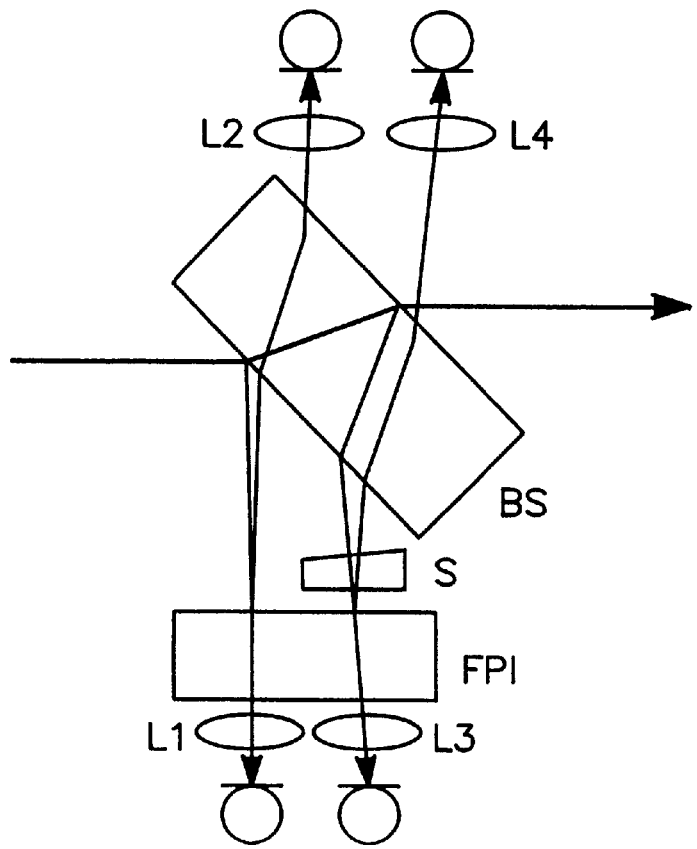
FIG. 6 shows a system according to FIG. 2, however, with optical lenses for the compensation of beam offset amounts.

FIG. 6 is a view of a system according to FIG. 2, however here optical lenses L1 to L4 are disposed in front of the detectors. These lenses provide for a compensation of the beam offset in translation or rotation of the structure relative to the laser beam. With this provision it is possible in a simple manner to match the required 90° phase shift by adjustment of the entire compact structure without any mechanical interference in the arrangement. The use of optical lenses may also be transferred to the systems according to FIGS. 1, 3, 4 and 5.

Figure 7:
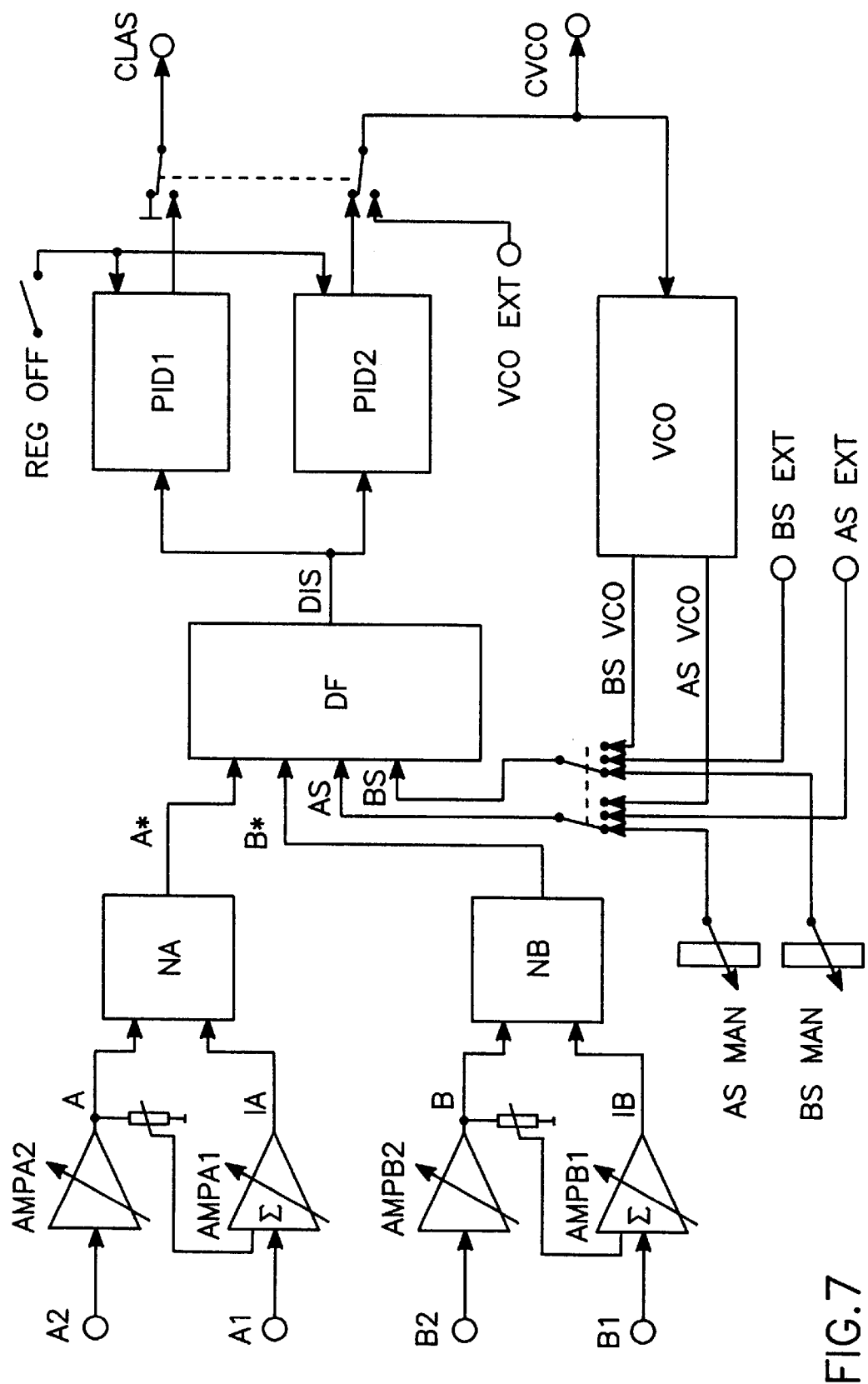
FIG. 7 is a block diagram of a system for the electronic analysis of the measured signals.

FIG. 7 is a block diagram of a system for the electronic analysis of the obtained signals. The four photodiode signals A1, B1, A2 and B2 are supplied to the amplifier circuits AMPA1, AMPA2, AMPB1 and AMPB2. As an intensity-proportional signal is frequently not directly available but only the signals reflected by the interferometer and the transmitted signals appropriate electronic summation means are used to generate the intensity-proportional signals IA and IB from these quantities, which are then suitable for the precise normalization of the signals A and B. These normalization processes are implemented in the joining blocks NA and NB. The normalized signals A* and B* are calculated in accordance with the relationships $$A^* = (2A/IA) - 1$$

and $$B^* = (2B/IB - 1)$$

In addition, adjustable offset signals may be subtracted. The following block DF has the function to calculate the variation of the measured frequency from the predetermined frequency. The measured frequency is proportional to the angle which results from an arc-tangent function on the measured quadrature signals A* and B*. The set frequency is therefore also defined by a quadrature signal AS and BS. An error or discriminator signal DIS should be generated with the correct sign, which signals whether the measured phase $\Phi$ from A* and B* or the predetermined phase $\Phi$ from AS and BS is greater. Here the following trigonometric relationship is employed:

$$\sin \phi \cos \Theta - \sin \Theta \cos \phi = \sin (\phi - \Theta)$$

hence $$DIS = A^* BS - AS B^*.$$

For small variations from the set value $\phi - \Theta$ applies $$\sin (\phi - \Theta) \approx \phi - \Theta,$$

which means a signal proportional to the frequency variation, which can be used directly to analyze the laser frequency or for frequency control circuits as a discriminator signal. This output signal DIS of the block DF is then supplied to two controller blocks PID1 and PID2 and can be used for various stabilization processes as will be described in the following. Finally, a two-phase oscillator VCO is provided for the stabilization processes. This is preferably a voltage-controlled sine/cosine oscillator or a corresponding digital device.

Figure 8:
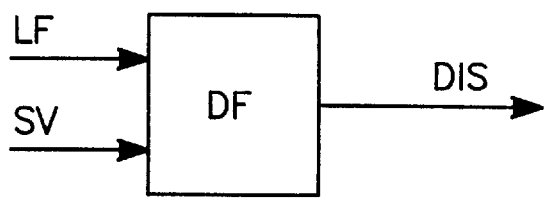
FIG. 8 is a functional diagram illustrating the detection of a variation from the set frequency.

The system may be used for three different circuitry variants in particular:

FIG. 8 illustrates a mere detection of the variation of the measured frequency from the predetermined frequency ($\phi - \Theta$). The variation DIS of the laser frequency from the set frequency, which is determined from the laser frequency LF, given by A*, B*, and from the set value SV, given by AS, BS, by means of the block DF, is output in this system and may be observed or recorded as a function of time or of the variation of any experimental parameters whatsoever. In particular deviations of the laser frequency related to a given value (or its average) can be measured with a high operation bandwidth. That allows the direct readout of the laser bandwidth and its frequency components.

Figure 9:
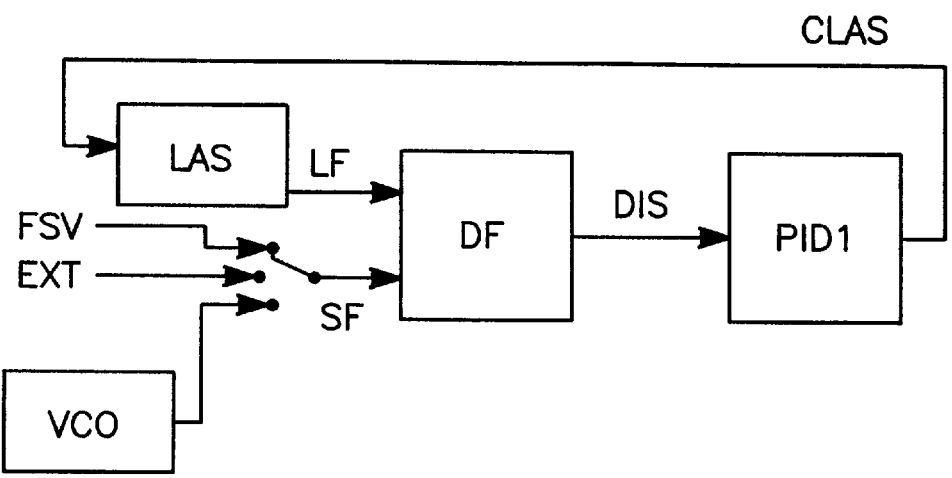
FIG. 9 is a functional diagram illustrating the stabilization of the measured laser frequency to a predetermined set frequency.

FIG. 9 illustrates a stabilization of the measured laser frequency LF, given by A*, B*, to the electronically predetermined set frequency SF, given by AS, BS. SF may be stagnant or variable versus time. The error signal DIS is supplied to a controller PID1 which outputs a control signal CLAS for controlling the frequency of the laser LAS. It is possible to use (a) signals FSV fixed in time (e.g. by two potentiometers AS MAN and BS MAN, cf. FIG. 7),
(b) a two-phase oscillator VCO (with the signals AS VCO and BS VCO in FIG. 7), or
(c) computer-controlled quadrature signals EXT (with the signals AS EXT and BS EXT in FIG. 7)

for a predetermination of the set frequency SF. The controller PID1 here controls the error signal DIS to zero by de-tuning the laser, which means that the laser frequency (given by the phase $\phi$ of the signals A* and B*) follows exactly the phase $\Theta$ of the predetermined set value signals AS and BS. With a constant oscillation frequency of the VCO elements (e.g. with a constant signal VCO EXT in FIG. 7) or with a suitable predetermination of the oscillating EXT values the laser then scans in a practically absolutely linear form whilst non-linearities, drifts and hystereses of the mechanical actors of the laser are suppressed practically entirely. With an appropriate signal generation it is also possible, if necessary, to realize a compensation of defects in the sinusoidal shape or the phase difference of the measured signals. To this end, the two external quadrature signals AS EXT and BS EXT may be fed. This is normally done with two digital/analog converter channels. In this way a digital computer can predetermine the laser frequency and this frequency may be optionally scanned in the forward and equally in the rearward direction. If required, the computer also implements the aforementioned compensation of defects in the sinusoidal shape and the phase shift of the measured signals by performing a previous reference measurement, e.g. with a calibrated wavelength standard.

Figure 10:
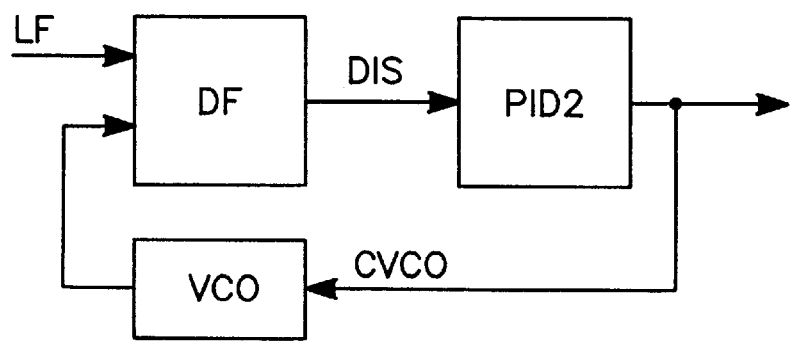
FIG. 10 is a functional diagram illustrating the stabilization of a two-phase oscillator to the measured laser frequency.

FIG. 10 illustrates a stabilization of a two-phase oscillator VCO to the measured laser frequency LF. The error signal DIS is supplied to this end to the controller PID2 which outputs a control signal CVCO for determining the oscillator frequency. This control signal is therefore proportional to the laser scan rate. Even frequency jumps of the laser can thus be temporarily and quantitatively detected with a sign.

The first controller PID1 controls a mechanical system, i.e. a component such as a laser with electromechanical actors, and must therefore be matched with this system with the time constants. The second controller PID2, by contrast, merely controls an electronic oscillator; the time constants can therefore be selected very rapidly in order to achieve a high detection rate. On principle, however, the same controller block can be used also for the two stabilization variants. Of course, both analog as well as digital working controllers may be used, if the speed requirements are fulfilled.

The signals A* and B* can also be used to observe the scanning behavior of the freely running laser by means of an oscilloscope. To this end, both controller blocks (PID1, PID2) are set into the reset state by the signal REG OFF in FIG. 7, which means that not any influence is taken on the laser or the VCO.

Figure 11A:
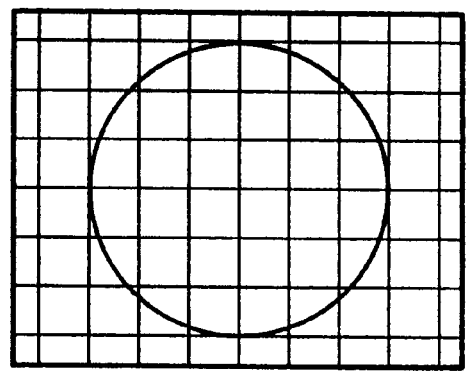

FIG. 11 illustrates the supply of the measured and normalized signals A* and B* to the X and Y inputs of an oscilloscope in an orthogonal layout. With a single-mode laser oscillation the observed signal comes full circle about the screen center, with a variation of the laser frequency, as is shown in FIG. 11a. A full circle here corresponds precisely to the FSR of the used interferometer whilst the angle, relative to the screen axes, corresponds to the laser frequency. The number of circles can be counted as well when the scanning width is varied. With a selective slight defect in the normalization also a spiral image may be obtained in which the number of the circles is easier to recognize without, however, any distinct loss in angular resolution.

Figure 11B:
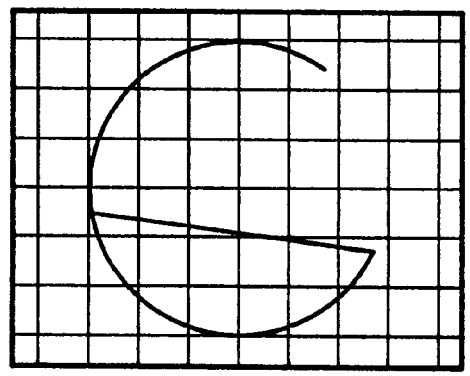

If, by contrast, a mode jump occurs the luminous or beam spot rapidly passes through the inner area of the circle (FIG. 11b).

Figure 11C:
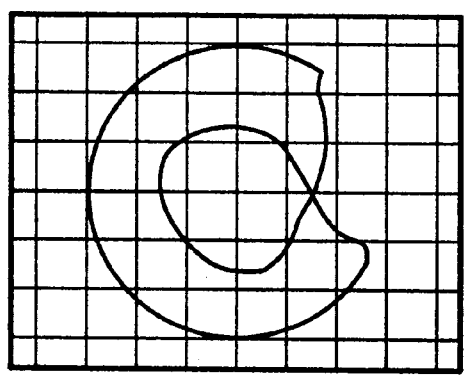

When the laser is partly scanning in multi-mode operation figures with a definitely smaller and non-constant radius will appear (FIG. 11c).

An electronic accessory unit may be used to generate a signal which is active when the radius, i.e. the instantaneous distance of the luminous spot from the screen center, drops below a value characteristic of single-mode operation. Then a warning signal may be output, for instance, or a connected electronic controller may be deactivated, which is possibly dependent on a trouble-free single-mode laser operation, or any other response may be triggered.

The radius is generated here electronically:

$$R^2 = (R \sin \phi)^2 + (R \cos \phi)^2$$

i.e.

$$R^2 = (A^*)^2 + (B^*)^2.$$

$R^2$ is compared by an electronic comparator against a constant characteristic for single-mode operation. This detection can be performed at a very high rate (in the MHz range) and therefore also be used to control high-speed controller circuits.

When PID2 (cf. FIG. 10) is active PID2 controls the error signal DIS to zero by influencing the frequency-determining signal CVCO of the oscillator, i.e. the phase $\Theta$ of the VCO signals (AS and BS) follows exactly the phase $\phi$ of the measured laser frequency (A*, B*) so that CVCO is hence proportional to the scanning rate. This mode of operation is particularly valuable for an analysis and the parameter adjustment of tunable lasers: by means of an oscilloscope, which is triggered to the scan source, the scan rate (rather than the laser frequency) is observed during the laser scan. The magnitude, direction and times of mode jumps are easy to recognize unambiguously, both with low and high scanning speeds at which conventional methods fail. It is particularly with widely tunable lasers having critical adjustment parameters, e.g. an external cavity laser (ECL), that parameter adjustment can be realized by real-time observation or by computer control and correction. The typical laser resonator length in ECLs comes under the range from a few millimeters up to some centimeters. In order to be able to detect a mode jump or a mode competition of neighboring modes of the external resonator with a high certainty and with a sign the FSR of the used etalon should roughly correspond to the triple FSR of the laser resonator, so that the etalon thickness corresponds approximately to ⅕ to ⅓ of the laser resonator length.

A measurement and compensation of scan linearity variations is important, for instance, in ECLs tunable over a wide range which are capable of scanning over several resonator modes of the laser chip: In the transition from resonance to anti-resonance of the external resonator to the laser chip resonator so-called push-pull effects occur on account of residual reflection of the laser exit facet and the resulting resonator couplings, which effects lead to an additional undesirable frequency modulation which is very disturbing in some measuring methods. These effects can be directly measured with the stabilization method according to FIG. 10 and compensated by the method according to FIG. 9.

The mechanical actuators of these lasers, too, display thermal drifts, non-linearities and hysteresis effects which may be corrected almost precisely in the aforedescribed manner.

The invention is, however, suitable for applications with any form of continuous and pulsed laser sources, especially for lasers tunable over a wide range, such as tunable diode lasers, dye lasers and solid state lasers. The prerequisite is merely a bandwidth of the laser light which is small or at least constant relative to the scanning width to be measured.

What is claimed is:

1. A method of laser frequency measurement and frequency stabilization by means of an interferometer on the basis of the generation of two quadrature signals shifted in phase by 90°, the method comprising the following steps:

generating first and second component beams which are separated spatially or by their polarization characteristics;

striking the interferometer with the first and second component beams so that the first and second component beams pass through or are reflected by the interferometer;

detecting the first and second component beams to produce first and second measured electronic signals;

measuring the laser frequency; and stabilizing the laser frequency, wherein the transmitted or reflected component beams being detected and with phase shifts of the measured signals by 90° being created by the different lengths of optical paths in the interferometer, wherein the differences of the path lengths of the component beams are created in the interferometer by different angles of incidence of the two component beams relative to an interferometer axis or by different continuously variable optical thicknesses of the interferometer for the two component beams.

2. The method according to claim 1, wherein the interferometer is a Fabry-Perot interferometer.

3. The method according to claim 1 or 2, wherein for the two components beams one or two normalization signals are generated which are proportional to the intensity of the component beams, with the quadrature signals being generated from the electronic signals by normalization by means of said normalization signals.

4. The method according to claim 3, wherein said quadrature signals are represented in two coordinates orthogonal on each other on an optical display means.

5. The method according to claim 3, wherein the laser frequency is generated by a laser source and a longitudinal single-mode operation of said laser source is detected by forming the absolute value of said quadrature signals.

6. The method according to claim 3, wherein said quadrature signals are stabilized to electronically predetermined set frequency quadrature signals.

7. The method according to claim 6, wherein a signal which is approximately proportional to the variation of a measured frequency from the predetermined laser frequency but largely independent of the absolute frequency is generated in an analog-electronic manner and serves as a discriminator signal in a control unit.

8. The method according to claim 6, wherein time-dependent electronic quadrature signals are predetermined as set-frequency quadrature signals.

9. The method according to claim 6, wherein two Airy functions, shifted in phase by roughly 90°, are predetermined as set-frequency quadrature signals.

10. The method according to claim 6, wherein signal profiles are predetermined as set-frequency quadrature signals which have previously been recorded by means of reference measurement in an electronic memory device.

11. The method according to claim 6, wherein the stabilization is employed to realize a compensation of mechanical, thermal or acoustic interference with a laser resonator.

12. The method according to claim 6, wherein the stabilization is employed to realize a compensation of thermal drifts non-linearities or hysteresis effects of mechanical actuator elements of the laser source.

13. The method according to claim 6, wherein the stabilization is employed to realize a correction of the scanning linearity of a tunable laser.

14. A device for laser frequency measurement on the basis of the generation of two signals shifted in phase by roughly 90°, comprising a beam splitter unit used to generate two component beams, an interferometer displaying a reflection and transmission coefficient which is different for the two component beams, with the two component beams either striking the interferometer at different angles or striking the interferometer at two sites of different thickness, at least two photosensitive sensors for detection of the two component beams transmitted or reflected by the interferometer by conversion into electronic signals, wherein the interferometer is a Fabry-Perot interferometer, and the Fabry-Perot interferometer comprises a wedge-shaped or stepped substrate inducing a required phase-shift between detected signals.

15. The device according to claim 14, wherein a wedge-shaped substrate is used as beam splitter unit, which has a wedge angle matched with the thickness of the interferometer (FPI) and the envisaged laser.

16. The device according to claim 14, wherein the required angle of incidence between the component beams is induced by said transmitting wedge-shaped substrate which is inserted between said beam splitter and said interferometer in one of said component beams or in both.

17. The device according to claim 14, wherein the two component beams either strike the interferometer at different angles, strike the interferometer at two sites of different thickness, or both component beams being given a difference in the length of the optical path due to their different polarizations.

18. The device according to claim 15, wherein the employed wedge-shaped substrate presents different wedge angles at different positions so as to allow for an adaptation of a required phase shift of detected signals.

19. The device according to claim 18, wherein a lens having a long focal length is used as wedge-shaped substrate with different wedge-angle.

20. The device according to claim 14, wherein said beam splitter unit consists of two parts angularly adjustable relative to each other.

21. The device according to claim 14, wherein a beam offset is compensated by translation or rotation of the device relative to a laser beam by means of optical lenses in front of said sensors.

22. The device according to claim 14, wherein the interferometer is electronically temperature stabilized in an active manner.

23. The device according to claim 14, wherein the fraction of the power drawn by the device from a laser beam is adjustable by the selection of a polarization plane of the laser radiation relative to the device.

24. The device according to claim 14, wherein said device is mechanically and electronically combined with a laser system as one unit.

25. The device according to claim 14, wherein an employed laser is a diode laser.

26. The device according to claim 14, wherein the laser is a diode laser with an external resonator coupled thereto.

27. The device according to claim 14, wherein the laser is a diode-pumped solid-state laser.

28. The device according to claim 14, wherein the interferometer is a Fabry-Perot interferometer, and a thickness of the Fabry-Perot interferometer comes within the range from roughly one fifth to half of the resonator length of the used laser.

29. The device according to claim 14, which further comprises a combination of two or more of said devices for an extension of the range of detection frequency or the resolution in detection.

30. A device for laser frequency measurement on the basis of the generation of two signals shifted in phase by roughly 90°, comprising:

a beam splitter unit used to generate two component beams;

an interferometer displaying a reflection and transmission coefficient which is different for the two component beams, with the two component beams being given a difference in the length of the optical path due to their different polarizations; and at least two photosensitive sensors for detection of the two component beams transmitted or reflected by the interferometer by conversion into electronic signals.

* * * * *